R. J. SCHULZ.
CLOTHES PIN.
APPLICATION FILED MAY 19, 1915.
1,159,804.
Patented Nov. 9, 1915.
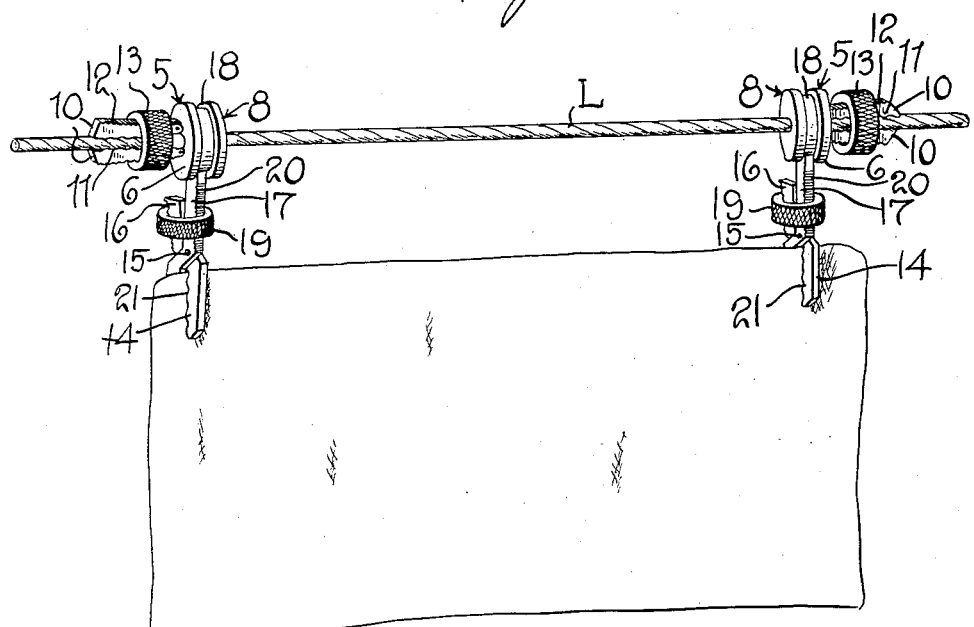
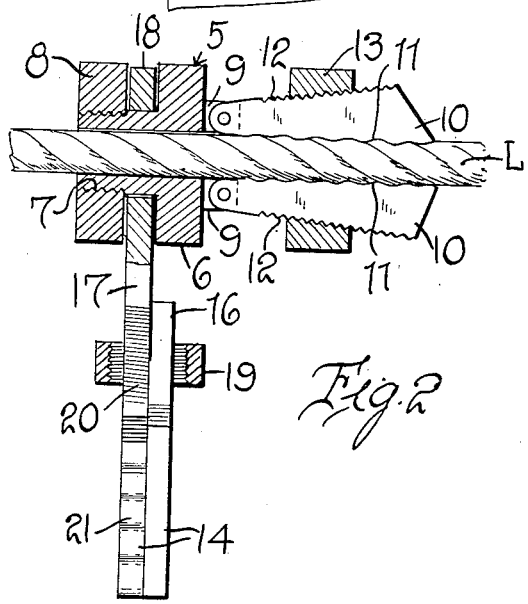
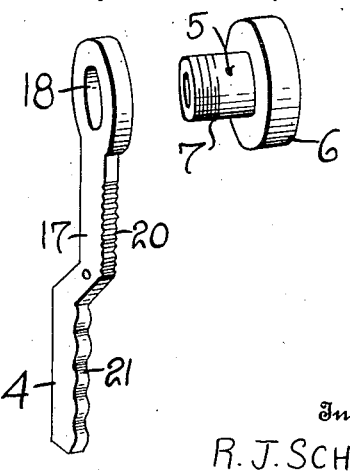
Inventor
R. J. SCHULZ
By Watson E. Coleman
Attorney

UNITED STATES PATENT OFFICE.

ROBERT JOHN SCHULZ, OF SAGINAW, MICHIGAN.

CLOTHES-PIN.

1,159,804.  Specification of Letters Patent. Patented Nov. 9, 1915.

Application filed May 19, 1915. Serial No. 29,141.

*To all whom it may concern:*

Be it known that I, ROBERT J. SCHULZ, a citizen of the United States, residing at Saginaw, W. S., in the county of Saginaw and State of Michigan, have invented certain new and useful Improvements in Clothes-Pins, of which the following is a specification, reference being had to the accompanying drawings.
This invention relates to an improved clothes pin or fastener and has for its primary object to provide a very simple device of this character which will serve to securely hold the articles upon the line and yet permit of their swinging or swaying movement with respect thereto when blown by high winds.

It is another object of the invention to provide a device adapted to be clamped in position upon the line, and a clothes fastener or securing member loosely connected to said clamp for swinging movement with respect thereto.

The invention has for a further general object to improve and simplify devices of the above character whereby the articles may be very easily and quickly attached to the same or removed, the device as a whole embodying comparatively few parts which are all of simple form so that the invention may be produced at relatively small cost.

With the above and other objects in view, my invention consists in the novel features of construction, combination, and arrangement of parts to be hereinafter more fully described, claimed, and illustrated in the accompanying drawing, in which, Figure 1 is a perspective view showing several of my improved clothes fasteners arranged upon a line; Fig. 2 is an enlarged longitudinal section; and Fig. 3 is a detail perspective view of the swinging clamp and one of the parts of the fastener.

Referring in detail to the drawing, 5 designates the body of a line clamp which is of cylindrical form and provided upon one end with an annular flange 6. The other end of this body member is exteriorly threaded, as at 7, to receive a ring or annulus 8. Upon the face of the flanged end of the body 6 spaced ears or lugs 9 are formed. To these lugs, the opposed clamping dogs 10 are pivoted. These dogs gradually taper or are reduced in width from their free ends to their pivoted ends and the opposed longitudinal edges of said dogs are toothed or serrated, as at 11. The opposite longitudinal edges of the dogs 10 are provided with screw threads, indicated at 12. A nut 13 is engaged upon the threaded outer faces of the dogs 10.

The clothes fastener proper consists of the jaws 14 which are crossed intermediate of their ends and connected together by the pivot pin 15. These jaws are provided upon one of their ends with the extended shanks 16 and 17, respectively, the shank 16 being gradually increased in width to its extremity. Upon the end of the shank 17, which is somewhat longer than the shank 16 of the other jaw, a ring or eye 18 is formed. This eye is loosely engaged upon the cylindrical body 5 of the line clamp and is retained in position thereon against longitudinal movement by means of the ring 8 which is threaded upon said body. A nut 19 is engaged upon the jaw shanks 16 and 17, said shanks being threaded, as at 20, upon their outer sides. The inner opposed faces of the jaws 14 are preferably corrugated, as at 21, so that they will securely grip and clamp an article arranged between the same.

In the use of my invention, the line indicated at L is passed through the central bore or opening of the body member 5, the eye 18 of the clothes fastener being engaged upon said body against one side of the flange 5. It will be understood that the nut 13 is threaded inwardly upon the dogs 10 so that said dogs may be spaced sufficiently to permit of the free sliding movement of the clamp upon the line. The ring 8 is threaded upon the end 7 of the clamp body and the several parts are then moved to the desired position upon the clothes line. The nut 13 is now threaded outwardly upon the wider ends of the dogs 10 so that said dogs will be forced inwardly and their toothed faces 11 caused to securely grip on opposite sides of the line L. The article is now disposed between the jaws 14 and the nut 19 threaded upwardly upon the shanks 16 and 17 of said jaws so as to force the jaws to closed position into clamping engagement with the article. It will be understood that two or more of the fasteners are employed for hanging sheets or other large articles upon the line. As the fastening devices may freely swing with respect to the line clamps, owing to the loose engagement of the terminal eyes 18 of the clamps, it will be manifest that the articles will not be blown from the fasteners by high winds but will readily sway or swing with respect to the line.

From the foregoing description, taken in connection with the accompanying drawing, the construction, manner of use and several advantages of my invention will be clearly and fully understood. The fasteners may be very easily and quickly arranged upon the line and securely clamped in the desired position, and the articles also readily attached to or removed from the swinging fastener. The device is preferably constructed of galvanized metal or other non-corrosive material. It is apparent that two or more of the article fasteners may be mounted in the manner above described upon a single line clamp, if desired.

The several parts of the device may also be variously modified in the form, proportion and structural details thereof and I, therefore, reserve the privilege of resorting to all such legitimate changes as may be fairly embodied within the spirit and scope of the invention as claimed.

Having thus fully described my invention, what I desire to claim and secure by Letters Patent is:—

1. A fastener of the character described including a body member, clamping dogs pivotally mounted upon said body member, means engaged upon said dogs for forcing the same into clamping engagement with a line, and an article fastener loosely engaged upon the body member for swinging movement with respect thereto.

2. A fastener of the character described including a body member, clamping dogs pivotally mounted upon said body member and gradually increasing in width to their free ends, a nut threaded upon said clamping dogs whereby the inner opposed faces of the dogs may be forced into gripping engagement upon opposite sides of the line, and an article fastener loosely engaged upon the body member for swinging movement with respect thereto.

3. A fastener of the character described including a body member having an annular flange on one end, said member being exteriorly threaded on its other end, opposed clamping dogs pivotally mounted upon the flanged end of said body member, a nut threaded upon the clamping dogs to force the same into gripping engagement upon the opposite sides of the line, an article fastener loosely engaged upon the body member for swinging movement with respect thereto, and a ring threaded upon the end of the body member to retain the article fastener in connection therewith.

4. A fastener of the character described including a body member having a flange on one end and exterior threads upon its other end, means on said body member for clamping the same in position upon a line, an article fastener consisting of pivotally connected clamping jaws having extended shanks, one of said shanks terminating in an eye for engagement upon said body member, a ring engaged upon the threaded end of the body member to retain the eye thereon, and a nut threaded upon the jaw shank to adjust the same into clamping engagement with an article.

In testimony whereof I hereunto affix my signature in the presence of two witnesses.

ROBERT JOHN SCHULZ.

Witnesses:
GUSTAV DABBERT,
HERB G. BLUKAMP.